United States Patent Office

3,639,466
Patented Feb. 1, 1972

3,639,466
PRODUCTION OF ACRYLIC ACID FROM RESIDUES OBTAINED IN WORKING UP ACRYLIC ACID
Otto Leichtle, Ludwigshafen (Rhine), Germany, assignor to Badische Anilin- & Soda-Fabrik Aktiengesellschaft, Ludwigshafen (Rhine), Germany
No Drawing. Filed Mar. 27, 1968, Ser. No. 716,295
Claims priority, application Germany, Apr. 3, 1967, P 16 18 129.6
Int. Cl. C07c 57/04
U.S. Cl. 260—526 W  8 Claims

ABSTRACT OF THE DISCLOSURE

An improved process for the production of acrylic acid by heating residues containing acryloylhydracrylic acid, β-acetoxypropionic acid, hydracrylic acid, dihydracrylic acid and polymerized hydracrylic acids, such as are obtained in working up acrylic acid, at temperature of from 130° to 250° C. in the presence of catalysts, the improvement consisting in using a catalyst a compound containing a secondary or tertiary amino group, or a tertiary phosphine. Acrylic acid, as such and in the form of its esters, is used for the production of polymers.

---

This invention relates to an improved process for the production of acrylic acid by heating residues obtained in working up acrylic acid in the presence of catalysts.

In the working up, by distillation, of acrylic acid obtained by carbonylation of acetylene or by oxidation of propylene, a residue containing appreciable amounts of acryloylhydracrylic acid, β-acetoxypropionic acid, hydracrylic acid, dihydracrylic acid and polymerized hydracrylic acid is obtained which is not made use of. Attempts have already been made to recover acrylic acid from these residues or from compounds contained in these residues. It is known from U.S. patent specification No. 2,485,510 that dihydracrylic acid can be split into acrylic acid by heating at temperatures above 270° C. in the presence of catalysts such as phosphoric acid, aluminum oxzide or calcium oxide. It is also known from U.S. Patent specification No. 2,469,701 that hydracrylic acid can be converted into acrylic acid by heating at 130° to 190° C. at subatmospheric pressure in the presence of inorganic acids. U.S. Patent specification No. 2,806,878 describes the cracking of polymerized hydracrylic acids at temperatures of 35° to 85° C., preferably at subatmospheric pressure, in the presence of Friedel-Crafts catalysts into monomeric acrylic acid. These methods have the disadvantage that long residence times are required so that the residues become viscous and finally solidify. Reactors therefore have to be cleaned at great expense. Another disadvantage of the methods is that very serious corrosion phenomena occur owing to the use of acids. Moreover the catalysts used very quickly become inactive owing to resinification. According to another method described in U.S. Patent specification No. 3,086,046, monomeric acrylic acid is obtained from distillation residues in the absence of catalysts by evaporating the residue and passing it into a vessel heated to 350° to 650° C. This method has the disadvantage that it is very difficult to completely evaporate the residues being treated.

It is an object of this invention to provide an improved process for the production of acrylic acid from residues obtained in the working up of acrylic acid in which shorter residence times are used than hitherto. It is a further object of this invention to provide an improved process in which the catalysts used remain active over long periods. It is another object of the invention to provide an improved process in which neither resinification nor corrosion takes place. It is yet another object of the invention to provide an improved process in which the residue obtained in the working up of acrylic acid does not have to be completely evaporated by expensive means.

In accordance with this invention these and other objects and advantages are obtained in an improved process for the production of acrylic acid by heating a residue containing acryloylhydracrylic acid, β-acetoxypropionic acid, hydracrylic acid, dihydracrylic acid and polymeric hydracrylic acid and obtained in the working up of acrylic acid, at a temperature of from 130° to 250° C. in the presence of a catalyst, the improvement consisting in the use as catalyst of a compound containing a secondary or tertiary amino group or a tertiary phosphine.

The starting material is obtained in the distillation of acrylic acid which has been prepared by carbonylation of acetylene or by oxidation of propylene. It consists for the most part, i.e. to the extent of more than 50% by weight, of hydracrylic acid, dihydracrylic acid, β-acetoxypropionic acid, acryloylhydracrylic acid and polymerized hydracrylic acids. In addition it contains varying amounts of indefinable resinous compounds and polymerized acrylic acid.

The process according to the invention is advantageously carried out at temperatures of from 130° to 250° C., particularly at temperatures of 150° to 190° C. Atmospheric pressure may be used. It is preferred however to use subatmospheric pressure, for example below 150 mm. Hg. Particularly good results are obtained by maintaining pressures of 20 to 100 mm. Hg.

Compounds containing secondary or tertiary amino groups, or tertiary phosphines, are used as catalysts. Preferred amino compounds boil at above 100° C., particularly at above 150° C. and have aliphatic, cycloaliphatic, araliphatic or aromatic radicals having up to 20 carbon atoms, or are compounds having up to fifteen carbon atoms in which the amino groups are contained in a ring system. The amino group may be present more than once, for example once to four times, in the molecule. Apart from the amino groups, the amino compounds preferably have hydrocarbon structure. It has proved to be particularly advantageous to use secondary or tertiary amines which contain alkyl radicals having four to sixteen carbon atoms or cycloalkyl, aralkyl or aryl radicals having six to ten carbon atoms. Compounds having four to ten carbon atoms in which the amino group is contained in a five-membered to eight-membered mononuclear or dinuclear ring system are also very suitable. Tertiary amines are particularly well suited as catalysts. Preferred tertiary phosphines have aliphatic or aromatic radicals, particularly hydrocarbon radicals, with up to twelve carbon atoms, particularly with up to eight carbon atoms. Tributyl phosphine and triphenyl phosphine are particularly suitable because they are readily accessible. Examples of other suitable compounds are trihexylamine, decyldibutylamine, stearyldimethylamine, stearylmethylamine, dodecylbutylamine, cyclohexyldibutylamine, dimethylaniline, N,N'-tetramethylhexamethylenediamine, pyridine, quinoline, N-methylimidazole, imidazole, N,N'-dimethylpiperazine, triphenyl phosphine, tributyl phosphine, trioctyl phosphine or phenyldibutyl phosphine.

The secondary or tertiary amino compounds or tertiary phosphines are advantageously used in amounts of 0.01 to 5% by weight, particularly in amounts of 0.1 to 2% by weight, with reference to the starting material used.

The process according to this invention may be carried out batchwise. For commercial-scale operation the continuous method is preferred however, and this method is described below by way of example. Residues containing hydracrylic acid, dihydracrylic acid and polymerized hydracrylic acids are passed continuously, with or without the addition of a polymerization inhibitor, together with the stated amount of a compound containing a secondary or tertiary amino group or of a tertiary phosphine at the said temperatures through a reaction vessel or through a number of successive reaction vessels, for example a cascade consisting of two to four vessels. The vapors formed are passed into a distillation column. Monomeric acrylic acid distils off at the top of the column, while constituents having a higher boiling point are drawn off from the bottom of the column and can be resubjected to cracking.

The acrylic acid obtained by the process according to the invention is suitable, as such or after having been esterified, for the production of polymers.

The invention is further illustrated by the following examples in which the parts specified are parts by weight unless otherwise stated. Parts by weight bear the same relation to parts by volume as the kilogram to the liter.

EXAMPLES 1 TO 9

800 parts of acrylic acid distillation residue having an acid number of 389 and an ester number of 334 is placed in a reaction vessel having a capacity of 1000 parts by volume and heated at a pressure of 100 mm. Hg. The vapors formed are passed into a distillation column and freed from constituents of high boiling point. The reaction conditions, the additives and the results achieved are set out in the following table. The catalysts added in the examples are: sulfuric acid (2); phosphoric acid (3); isoquinoline (4); quinoline (5); tributylamine (6); N,N-dimethylcyclohexylamine (7); triphenyl phosphine (8) and tri - n - butyl phosphine (9). E=Example No.; C=amount of catalyst in percent; T=temperature ° C.; R=reaction period in minutes; A=parts of acrylic acid obtained.

TABLE

| E | C | T | R | A |
|---|---|---|---|---|
| 1 | Nil | 184 | 253 | 608 |
| 2 | 1 | 169 | 138 | 590 |
| 3 | 1 | 177 | 219 | 535 |
| 4 | 1 | 172 | 102 | 645 |
| 5 | 1 | 178 | 130 | 650 |
| 6 | 1 | 173 | 126 | 640 |
| 7 | 1 | 175 | 84 | 635 |
| 8 | 1 | 172 | 134 | 632 |
| 9 | 1 | 177 | 77 | 653 |

EXAMPLE 10

2.7 parts of N,N-dimethylcyclohexylamine and 442 parts of a distillation residue having an acid number of 460 and an ester number of 255 and obtained from the distillation of acrylic acid are metered each hour into the first reaction vessel of a cascade of two reaction vessels each having a capacity of 500 parts by volume. The overflows from the reaction vessels are arranged so that each vessel is filled with 300 parts by volume. At a pressure of 50 mm. Hg, the contents of the first vessel are kept at 157° C. and that of the second reaction vessel at 177° C. The vapors formed in the two reaction vessels are combined and passed through a distillation column. 350 parts of acrylic acid is obtained per hour at the top of the column. The mixture obtained at the bottom of the column is returned to the first reaction vessel.

We claim:

1. In a process for the production of acrylic acid by heating a residue containing acryloylhydracrylic acid, β-acetoxypropionic acid, hydracrylic acid, dihydracrylic acid and polymerized hydracrylic acids which has been obtained in working up acrylic acid, at a temperature of from 130° to 250° C. and in the presence of a catalyst, the improvement which comprises using as the catalyst a compound selected from the group consisting of (a) secondary or tertiary amines boiling above 100° C. which contain an aliphatic, cycloaliphatic, araliphatic or aromatic radical having up to twenty carbon atoms or which is a heterocyclic amine having up to fifteen carbon atoms in which an amino group is contained in the ring system and (b) a tertiary phosphine which contains an aliphatic or aromatic radical having up to twelve carbon atoms, in an amount of 0.01 to 5% by weight with reference to the starting material.

2. A process as claimed in claim 1 in which the catalyst used is a secondary or tertiary amine which contains an alkyl radical having four to sixteen carbon atoms or a cycloalkyl, aralkyl or aryl radical having six to ten carbon atoms.

3. A process as claimed in claim 1 wherein the catalyst used is a tertiary amine.

4. A process a claimed in claim 1 wherein the catalyst used is triphenyl phosphine.

5. A process as claimed in claim 1 wherein the catalyst used is tributyl phosphine.

6. A process a claimed in claim 1 wherein a temperature of from 150° to 190° C. is used.

7. A process as claimed in claim 1 wherein the reaction is carried out at a pressure of less than 150 mm. Hg.

8. A process as claimed in claim 1 wherein the catalytic compound is used in an amount of from 0.1 to 2% by weight with reference to the starting material used.

References Cited

UNITED STATES PATENTS

| 2,361,036 | 10/1944 | Kung | 260—526 U |
| 2,376,067 | 5/1945 | Long | 260—526 U |
| 2,469,701 | 5/1949 | Redmon | 260—526 U |
| 2,485,510 | 10/1949 | Redmon | 260—486 D |
| 2,568,635 | 9/1951 | Jansen | 260—526 U |
| 2,568,636 | 9/1951 | Japs | 260—526 U |

LEWIS GOTTS, Primary Examiner

J. L. DAVISON, Assistant Examiner